United States Patent Office 3,326,942
Patented June 20, 1967

3,326,942
HERBICIDAL SUBSTITUTED PHENOXY ACYLAMIDES
Robert J. Geary, Vero Beach, Fla., assignor to Plant Products Corp., Vero, Beach, Fla., a corporation of Florida
No Drawing. Filed Oct. 22, 1963, Ser. No. 318,088
6 Claims. (Cl. 260—347.3)

This invention relates to the production of novel chemical compounds, and more particularly to novel phenoxy acylamide compounds having herbicidal properties, to agricultural chemical compositions containing such compounds, and to methods for utilizing the same for herbicidal purposes.

Increasing use has of late been made of chemicals as plant growth regulants, i.e. for altering the growth characteristics of plants as by temporarily inhibiting plant growth or by destroying certain plants (phytocides or herbicides), or by soil sterilization, prevention of seed germination, etc., or by causing so-called hormone responses such as defoliation of growing plants, promotion of storage stability of crops, causing abscission of fruit and producing male sterile plants (parthenocarpy), etc. Although a number of different chemicals have been previously proposed for such uses, including certain types of phenoxy acylamides, they have been generally subject to one or more disadvantages, as for example unduly high cost, insufficient or excessive activity or selectivity, instability in storage or use, and/or inadequate solubility properties and the like.

It is an object of this invention to provide a group of novel chemical compounds. Another object of this invention is the provision of such a group of chemical compounds having herbicidal, phytocidal or weed-killing activity which will not be subject to one or more of the above disadvantages. A further object of the invention is the provision of novel agricultural chemical compositions containing as the essential herbicidal component one or a mixture of such novel chemical compounds. Still another object of this invention is the provision of a method for employing such novel chemical compounds and compositions to kill weeds, i.e. plants which persist in growing where they are not wanted.

The attainment of the above objects is made possible by my discovery that improved and unexpected herbicidal activity is possessed by a novel group of phenoxy acylamides having the formula R—O—(CH$_2$)$_n$—CO—NR$^1$R$^2$ wherein R is

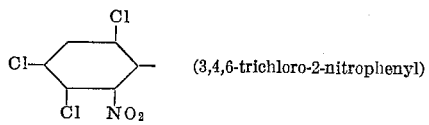
(3,4,6-trichloro-2-nitrophenyl)

R$^1$ and R$^2$ are selected from the group consisting of H, lower aliphatic and alicyclic, aryl, and heterocyclic, and $n$ has a value of 1 to 3. It has been unexpectedly found that the compounds of the above formula are specific and selective in their herbicidal effect on most weeds including monocotyledons such as the grasses in addition to dicotyledons, but yet do not exhibit typical hormone-like effects of commonly employed plant growth regulants such as 2,4 D and 2,4,5 T. Thus, although 2,4 D in dilutions as low as 1 part per million (p.p.m.) shows a very strong inhibition of the growth of roots of cucumber seedlings, a standard test for hormone-like activity, the compounds of the above formula do not inhibit such growth at even 10 p.p.m. Similar distinctions exist with respect to 2,4,5 T. Again, when 2,4 D or 2,4 T in lanolin is applied to one side of a tomato plant stem (another standard test), the growth stimulating effect on that side will cause the plant to bend in the opposite direction, an effect called epinasty. The compounds of the above formula do not exihibit this effect when so tested.

Another highly advantageous and unexpected property of the compounds of my invention is their ineffectiveness against leguminous plants, particularly peanuts, soybeans, birdsfoot trefoil, alfalfa, clover, etc. At concentrations of about 1 to 4 pounds per acre, by pre-emergence or post-emergence treatment, said compounds are highly effective in their herbicidal activity against broad-leaf and other weeds without harming such legumes. Such post-emergence treatment is similarly effective against grasses.

In the above formula, R$^1$ and R$^2$ may be the same or different and can represent H, lower aliphatic and alicyclic (1 to 6 carbon atoms), aryl (phenyl, naphthyl), heterocyclic, and substituted derivatives thereof. Lower aliphatic values for R$^1$ and/or R$^2$ include alkyl such as methyl to hexyl, isoalkyl such as isoprpoyl to isohexyl, the corresponding ethylenically unsaturated radicals such as vinyl to hexene and isopropenyl to isohexenyl, and their hydroxylated derivatives such as hydroxyethyl and hydroxyisopropyl. Alicyclic values include cyclopentyl, cyclopentenyl, cyclohexyl and cyclohexenyl. Aryl values include phenyl and naphthyl and their nitro, chloro, bromo, and lower aliphatic (as above defined) substituted derivatives such has 3-chlorophenyl, 2-methylphenyl, 2-sec. butyl-4,6-dinitrophenyl, 3,5-dibromophenyl, pentachlorophenyl, 4-hydroxyethylphenyl, 2-vinylphenyl, 2-chloronaphthyl - 1, 1-nitronaphthyl-3, 1,8-dibromonaphthyl-4, and the like. Further, R$^1$ and/or R$^2$ may represent furfuryl or other heterocyclic radical, or may together represent the atoms necessary to complete a 6-membered heterocycle with the N atom such as pyridyl, piperidyl, picolinyl, pyrimidyl, —C$_2$H$_4$—NH—C$_2$H$_4$—, morpholinyl, etc.

The following list of compounds are only illustrative of my inveniton which comprehends compounds of the above formula containing all the permutations of value and position described above, and all of which are operative for the attainment of the desired results by reason of the critcial presence therein of the 3,4,6-trichloro-2-nitrophenyl radical in conjunction with the remainder of the compound:

2-(3,4,6-trichloro-2-nitrophenoxy) - N,N - diethylacetamide, -dimethylacetamide, -dipropylacetamide, -N-methyl-N-ethylacetamide, representing preferred embodiments wherein $n$ is 1 and R$^1$ and R$^2$ are both 1 to 3 carbon alkyl, desirably ethyl;

2-(3,4,6-trichloro-2-nitrophenoxy - N - (3 - chlorophenyl)-, -furfuryl-, -methyl-, -isohexyl-, -vinyl-, -isobutenyl-, -hydroxyethyl-, -cyclohexyl-, -cyclopentenyl-, phenyl-, -(2-methylphenyl)-, -(2-sec. butyl-4,6-dinitrophenyl), -(3,5-dibromophenyl)-, -pentachlorophenyl-, -(4-hydroxyethylphenyl)-, -(2-vinylphenyl)-, -naphthyl-, -(2-chloronaphthyl-1)-, -(1-nitronaphthyl-3)-, -(1,8-dibromonaphthyl-4)-acetamide;

the N,N-sym. disubstituted (R$^1$=R$^2$) and N,N-unsym. or mixed disubstituted (R$^1$≠R$^2$) acetamides corresponding to the compounds listed in the foregoing paragraph, as for example the -N,N-bis(3-chlorophenyl)-, -N,N-difurfuryl-, -N,N-dihydroxyethyl-, -N-methyl - N - phenyl-, -N-vinyl-N-cyclohexyl-, -N-isohexyl-N-naphthoxy - acetamide, etc.;

2-(3,4,6-trichloro-2-nitrophenoxy) - acetyl pyridide, piperidide, picolide, pyrimidide, morpholide.

the propionamides and butyramides, including the isobutyramides ($n$ in the above formula is 2 or 3), corresponding to (i.e. in a homologous series relationship with) the acetamides listed above, and the propionyl and butyryl compounds corresponding to the acetyl compounds listed above.

The compounds of the present invention are in general prepared by reacting 3,4,6-trichloro-2-nitrophenol with an equimolar amount of the desired omega-chloroacylamide of the formula $Cl-(CH_2)_n-CO-NR^1R^2$, wherein $n$, $R^1$, and $R^2$ have the values given above. The reaction is carried out at an elevated temperature of at least about 50° C., as for example on a steam bath, with evolution of HCl gas as a byproduct. The reaction mixture may be agitated, and preferably fully enclosed due to the hazardous HCl which should be withdrawn as evolved. Superatmospheric pressures may hasten the reaction which usually takes from 4 to 10 hours for completion. The resulting products are for the most part oily liquids insoluble in water which may be used for the desired herbicidal purposes without further purification. If desired the reaction may be carried out in the presence of an HCl acceptor, preferably an organic base such as pyridine, picoline, triethylamine, trimethylamine or the like. The amine salt byproduct is removed following completion of the reaction by cooling the reaction mixture and filtering off the byproduct.

The compounds of the present invention may be applied directly or indirectly to any part of the weed, which is preferably in an active state of growth. Such compounds are soluble in the waxy tissues of the weed, selectively absorbed into the leaves of the weed, and translocated throughout the weed system to the roots to exert their desired herbicidal effect. They may be applied to the growing weeds or weed seedlings or to the soil adjacent thereto or in which the weeds are germinating or expected to germinate. It will be understood that because of the high activity of these compounds, they must generally be employed in relatively small amounts.

The agricultural chemical compositions of the present invention are prepared by formulating one or a mixture of the above-defined phenoxy acylamide compounds with a carrier which may be a finely divided solid for use as a dust, or a liquid, for example as a suspension or dispersion in water, as an oil-in-water type emulsion or as a solution in an organic solvent. Desirably, the compositions should contain a surface active agent which may be a dispersing, emulsifying or wetting agent, or a combination thereof.

In the formulation of powders for application as dusts, the described herbicide is uniformly admixed with a free-flowing particulate dry inert solid carrier which may be organic or inorganic. Examples of such organic carriers include sawdust, the flours derived from soybean, peach pit, apricot, tobacco, walnut shell, wheat, wood, byproduct lignin and lignocellulose, lignin sulfonic acid, urea, cork, urea-formaldehyde and other resins, and the like. As inorganic carriers, there may be employed the silicas such as diatomite, pumicite, and tripolite, carbonates such as calcium bicarbonate and carbonate, calcite and dolomite, silicates such as talc, pyrophillite, mica including vermiculite and the like, various clays such as montmorillonite, saponite, kaolinite, attapulgite, and the like, tricalcium phosphate, boric acid, etc. These powders should preferably have a particle size of about 0.5 to 10 microns, which may be obtained with the usual mixing, blending or grinding equipment and may generally contain, in addition to the carrier, about 0.5 to 20% of the active compound, and desirably about 0.2 to 5% of a wetting agent or dispersing agent or the like. The addition of such agents renders the dust wettable and dispersible, thereby facilitating the application thereof from an aqueous dispersion or slurry in the field. The ingredients may be simply mixed together thoroughly, or the active compound sprayed directly or in the form of a solution in a volatile organic solvent on the carrier with agitation after which the solvent is evaporated off.

The surface-active agents operative in the present compositions are well known, may be anionic, nonionic or cationic, and examples of such agents are fully disclosed in U.S. 2,614,916. Such disclosures in said patent are incorporated herein by reference to avoid needless repetition. Briefly, sodium lauryl sulfate and sulfosuccinate are exemplary of anionic agents, nonylphenoxyoctaethenoxyethanol of nonionic agents, and dodecyldimethylbenzyl ammonium chloride of cationic agents. In general, wetting agents improve and/or accelerate absorption by and penetration into the weed part, dispersing agents facilitate the production of more uniform and/or stable suspensions of the solid particles of the composition in a liquid, preferably water, and emulsifying agents facilitate the production of more uniform and/or stable emulsions of the present compositions or compounds in organic solvent solutions in water as the matrix or continuous phase.

As pointed out above, the carrier may also be a liquid if the active herbicide is to be applied in the form of a spray, or by brushing or impregnation. These liquid formulations may contain the active herbicidal compound in dilutions ranging from about 1:10 to 1:3,000 depending upon the liquid diluent, the intended use, and the like. The higher dilutions of the order of 1:400 to 1:3,000 are employed in the case of applications from aqueous slurries or suspensions or oil-in-water emulsions. In producing the aqueous slurries or suspensions, the above-described wettable powder formulations may be simply dispersed in the required amount of water in the field to produce the desired concentration necessary for spraying. In the production of oil-in-water emulsions, a concentrate of the herbicidal compound in an organic solvent therefor, such as petroleum oil and a mutual solvent, may be prepared and made available for sale or immediate use, which concentrate preferably further contains an oil-soluble oil-in-water type emulsifying agent facilitating emulsification of the concentrate in water for application in the field.

If the occasion arises, the above-described solutions of the present active compounds in organic solvent solution may be applied as such, in more or less concentrated form, directly or indirectly to the plant, as for example in a small hand sprayer. In such case, higher concentrations of the order of 1:10 to 1:100 dilution may be employed. If desired, such organic solvent formulations may be prepared in the form of an aerosol in which the active compound is dispersed in a liquid capable of expanding rapidly into a gas at normal temperatures and pressures (propellants of known type) to atomize the composition. Such composition may for example contain up to 3% of the active herbicide, up to 10% of a coupling or mutual solvent such as cyclohexanone, up to 10% of an oil such as mineral or vegetable, which serves to regulate the particle size, if desired, and the remainder a solvent propellant such as dichloro-difluoromethane and other Freons, methyl chloride or other known propellant for aerosols.

It will be understood that the herbicide compounds of the present invention may be applied in 100% form, but this is impractical because of difficulties in handling, measuring, applying, etc. Formulated compositions as described above are therefore preferred. Regardless of whether the herbicide compound of the present invention is applied pure or in formulations to the weed or its environs, it is always used in an effective or herbicidal amount, which amount is readily ascertainable by a person of ordinary skill in the art by routine experimentation. It will be understood that these compositions may contain other functional agents and assistants such as pesticides including insecticides, arachnicides, bactericides, fungicides, and the like, fertilizers, other herbicides, bonding, spreading and sticking agents and the like.

It has been further found that the herbicidal activity of the compounds of the present invention is still further improved by addition thereto of an approximately equal amount by weight of glycolic acid, thioglycolic acid or other similar hydroxy acid in the above described agricultural compositions.

Bodies of water such as ditches, lakes, ponds, canals, rivers, reservoirs, and the like, can be treated with the present herbicidal compounds or compositions containing the same as described above to control undesirable aquatic vegetation including floating, partially submerged, and totally sub merged weeds. In these aquatic applications, the present compounds and compositions may be applied upon or below the surface of the water in amounts sufficient to yield therein an active compound concentration of about 1:1000 and preferably 10 to 50 p.p.m., at which concentration the compound is for practical purposes water soluble and effective for periods ranging from a few minutes to several days. If desired, the present compositions may be specially prepared to sink to the bottom of the water and slowly release the active compound over an extended period of time. One method involves mixing the active compound with a heavier-than-water chlorinated benzene compound such as trichloro- or tetrachloro-benzene in the presence of an emulsifying or wetting agent and if desired a miscible solvent such as carbitol or the like to produce a heavy emulsion which sinks to the bottom. Another method involves incorporating the active herbicidal compound into the amide-formaldehyde resinous pesticidal compositions disclosed and claimed in my copending application Serial No. 846,238, now U.S. Patent 3,223,513.

The following examples are only illustrative of this invention and are not to be regarded as limitative. All parts and proportions referred to herein and in the appended claims are by weight unless otherwise indicated.

*Example 1*

A mixture containing equimolar amounts of 3,4,6-trichloro-4-nitrophenol and 2-chloro-N,N-diethylacetamide is introduced into a gas-tight reaction vessel provided at the top with a valved opening for withdrawing the HCl gas evolved. The vessel is closed, heated gently on a water bath for about 30 minutes and then on a steam bath for about 10 hours, withdrawing the evolved HCl as formed. The resulting 2-(3,4,6-trichloro-2-nitrophenoxy)-N,N-diethylacetamide is an oily liquid with highly effective herbicidal properties as described above. Corresponding products are obtained by substituting in this example, instead of 2-chloro-N,N-diethylacetamide, any of the above described omega-chloroacylamides of the formula $$Cl-(CH_2)_n-CO-NR^1R^2$$

wherein $n$, $R^1$ and $R^2$ have the values given above and exemplified in the list of representative products.

*Example 2*

A mixture containing equal amounts of the product of Example 1 and isooctyl phenol decaethylene glycol ether (surface active agent) is sprayed on granules of clay or Celite being agitated in a rotary mixer in proportions to yield a solid particulate composition containing 5% of said product.

*Example 3*

A liquid concentrate is prepared containing 25% of the product of Example 1 and 5% of the surface active agent of Example 2 in xylene, toluene, cyclohexane, alcohol, carbitol, and/or petroleum oil.

*Example 4*

The concentrate of Example 3 is emulsified in water to yield an emulsion containing 3% active herbicide compound.

*Example 5*

A mixture of equal parts of the product of Example 1 and naphthalene formaldehyde sulfonic acid (dispersing agent) is employed to impregnate silica granules in proportions to yield 8% in the composition of the active herbicide compound. The mixture is then ground to a fine powder.

The compositions of Examples 2 to 5, spread at a rate of 1 to 4 pounds per acre, in fields with growing peanut and soybean plants, birdsfoot trefoil, alfalfa and clover, provided highly effective control of grasses and broadleaf weeds.

This invention has been disclosed with respect to certain preferred embodiment, and various modifications and variations thereof, which are to be regarded as equivalents included within the scope of this invention, will become obvious to persons skilled in the art. Such obvious modifications and variations are to be included within the scope of the appended claims.

I claim:
1. A compound of the formula

$$R-O-(CH_2)_n-CO-NR^1R^2$$

wherein R is 3,4,6-trichloro-2-nitrophenyl,
$R^1$ is H or 1 to 6 carbon atom alkyl, $R^2$ is 1 to 6 carbon atom alkyl, phenyl, chlorophenyl, bromophenyl, or furfuryl, and $n$ has a value of 1 to 3.
2. 2-(3,4,6-trichloro-2-nitrophenoxy)-N,N-diethylacetamide.
3. 2-(3,4,6-trichloro-2-nitrophenoxy)-N,N-dimethylacetamide.
4. 2-(3,4,6-trichloro-2-nitrophenoxy)-N,N-dipropylacetamide.
5. 2-(3,4,6-trichloro-2-nitrophenoxy)-N-(3-chlorophenyl)-acetamide.
6. 2-(3,4,6-trichloro-2-nitrophenoxy-N-furfuryl-acetamide.

References Cited

UNITED STATES PATENTS

| | | | |
|---|---|---|---|
| 2,908,573 | 10/1959 | Bush et al. | 260—559 X |
| 2,957,760 | 10/1060 | Tafuro et al. | 71—2.6 |
| 2,992,091 | 7/1961 | Harman et al. | 71—2.6 |
| 3,027,407 | 3/1962 | Major et al. | 260—559 |
| 3,073,863 | 1/1963 | Croxall et al. | 260—559 |

NICHOLAS S. RIZZO, *Primary Examiner.*

HENRY R. JILES, *Examiner.*